(No Model.)
C. W. HEWITT.
BUGGY SPRING.
No. 578,874. Patented Mar. 16, 1897.
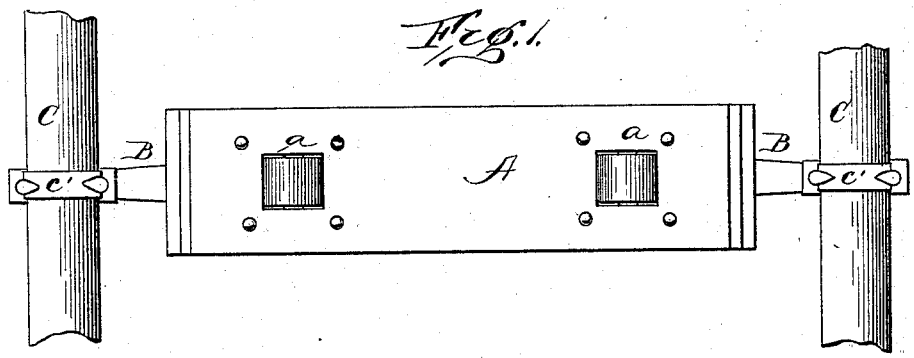
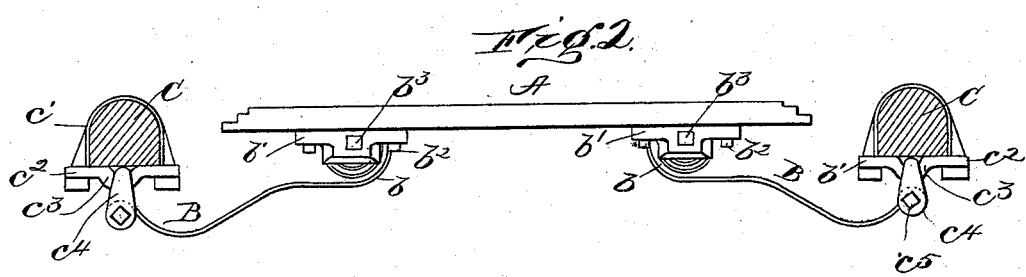
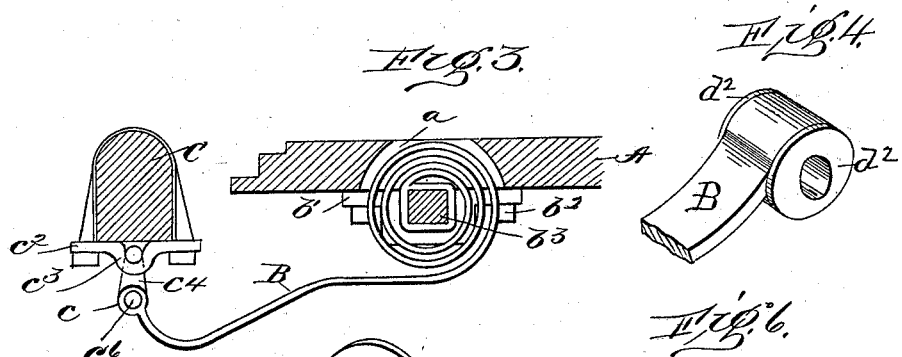
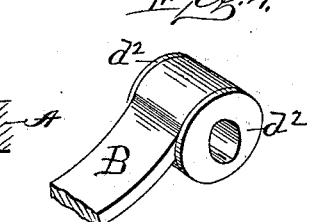
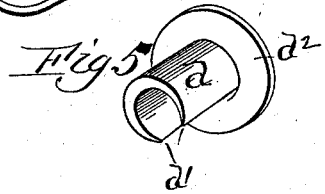
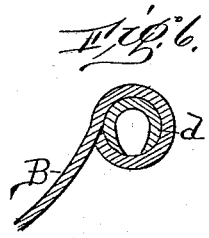
Witnesses:
J. M. Fowler Jr.
R. E. Rabbitt.
Inventor
C. W. Hewitt
By John S. Duffie
Attorney

UNITED STATES PATENT OFFICE.

COLUMBUS W. HEWITT, OF DARLINGTON, SOUTH CAROLINA.

BUGGY-SPRING.

SPECIFICATION forming part of Letters Patent No. 578,874, dated March 16, 1897.

Application filed July 1, 1896. Serial No. 597,748. (No model.)

*To all whom it may concern:*

Be it known that I, COLUMBUS W. HEWITT, a citizen of the United States, residing at Darlington, in the county of Darlington and State of South Carolina, have invented certain new and useful Improvements in Buggy-Springs; and I do hereby declare the following to be a full, clear, and exact description of the invention, such as will enable others skilled in the art to which it appertains to make and use the same.

My invention is a spring for buggies, carriages, and such like vehicles; and it consists in the novel construction and arrangement of its parts hereinafter set out in this specification and the claims hereunto attached.

In the accompanying drawings, Figure 1 is a top plan view of my invention. Fig. 2 is a vertical view. Fig. 3 is a vertical sectional view with the bearing, Fig. 5, left out. Fig. 4 is the outer end of one of the springs having inserted in the eye thereof the flanged bearing. Fig. 5 is a perspective view of the flanged bearing, and Fig. 6 is a longitudinal sectional view of Fig. 4.

My invention is described as follows:

A is a plate having near each end a vertical opening $a$. Two or more of these plates are secured crosswise under the bottom of the body of the vehicle and extend from side to side.

B are the springs. The coil ends $b$ of these springs are secured in bearings $b'$ by means of square bolt $b^3$. Square bolt $b^3$ fits in a square perforation in bearings $b'$. The inner and extreme end of the coil is securely fastened to said square bolt $b^3$. Said bearings $b'$ are secured to the lower face of the plate A by means of bolts and nuts $b^2$. The perforations $a$ in the plate A are for the purpose of accommodating the upper part of the coils $b$ of the springs B.

The springs B extend outward from either side of the vehicle and slightly downward, their extreme outward ends coming immediately under the side-bars C. The ends of the springs are each provided with an eye $c$.

In the eye of the spring B is inserted a bearing $d$. The said bearing $d$ is shaped like a horseshoe, its toe part being thicker than its points and is placed upward in the eye $c$. The points $d'$ of this bearing do not come together. This is to enable it to be adjusted easily in the eye $c$. On one end of this bearing is rigidly secured a flange or washer $d^2$, so as to hold the pendants $c^4$ a little off from the edges of the spring B to prevent friction against the spring as the buggy springs up and down. There are two bearings and two washers for each spring, said bearing being driven in each end of the eye $c$. When the bearings become worn, they may be driven out and replaced by new ones.

Over the side-bars C are secured clips $c'$. The under bars $c^2$ of said clips have a downward bend $c^3$, and in each downward bend is swiveled a pendant $c^4$, and through each end of said pendant are perforations $c^5$, and between the lower ends of these pendants is pivoted the extreme ends of the springs B by means of bolts $c^6$.

Having described my invention, what I claim as new, and desire to secure by Letters Patent, is—

1. The combination of the plate A, provided with vertical perforations $a$; bearings $b'$, secured to the bottom of said plate, and each having a square horizontal perforation; square bolts $b^3$, one secured in each of said perforations; springs B, having coiled ends $b$, and eyes $c$, the coiled ends of the springs $b$, secured to bolts $b^3$, and working in the bearings $b'$; bearings $d$, secured in the eyes $c$; washers $d^2$, secured to the outer ends of bearings $d$, and against the ends of the walls of eyes $c$; side-bars C; clips $c'$, fitting over said side-bars; pendants $c^4$, swiveled to said clips; eyes $c$, bearings $d$, and washers $d^2$, pivoted between the lower ends of said pendants, substantially as shown and described and for the purposes set forth.

2. The combination of the plates A, provided with the vertical perforations $a$; bearings $b'$, secured to the bottom of said plates A, by means of bolts and nuts $b^2$, and having square horizontal perforations; square bolts $b^3$, one fitting in each of said perforations; springs B, having coiled ends $b$, and eyes $c$, the extreme ends of said coils rigidly secured to the square bolts $b^3$, and working in the bearings $b'$ and perforations $a$; side-bars C, one on each side of the vehicle; clips $c'$, fitting over said bars; plates $c^2$, provided with the downward bends $c^3$; pendants $c^4$, swiveled in said downward bends; horseshoe-bearings $d$, having washers $d^2$, and fitting in the eyes $c$, of said spring; the eye ends of the springs B and bearings $d$, pivoted between the lower ends of said pendants by means of bolts $c^6$, substantially as shown and described and for the purposes set forth.

In testimony whereof I affix my signature in presence of two witnesses.

COLUMBUS W. HEWITT.

Witnesses:
T. E. SLIGH,
E. E. LUNN.